Figure 1:
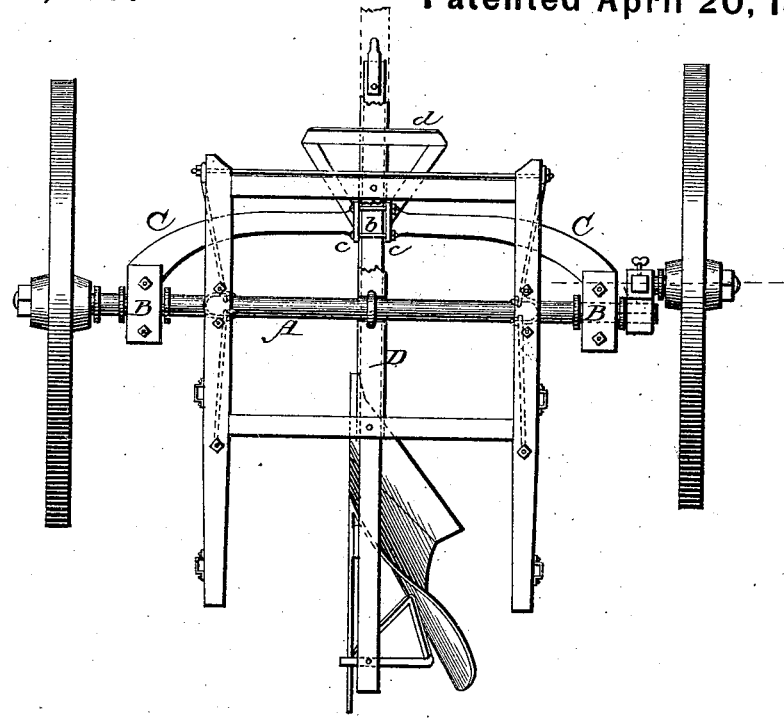
Figure 2:
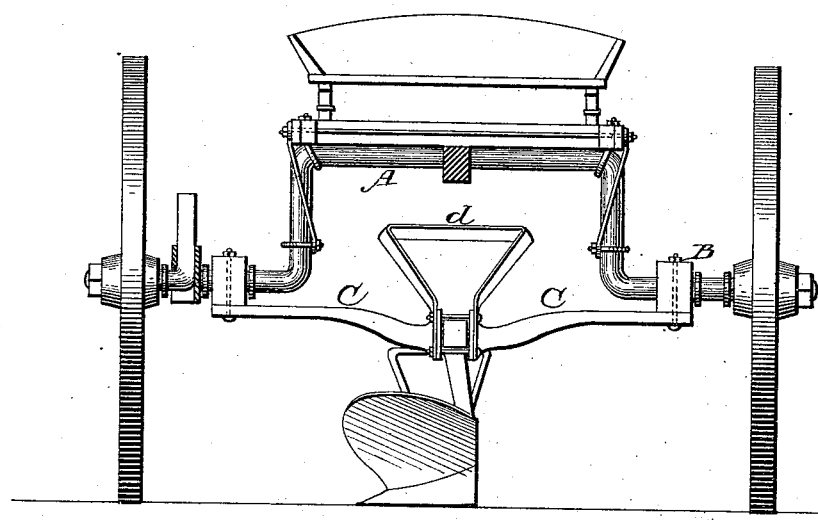

M. GLASSCOCK.
Plow.

No. 226,609. Patented April 20, 1880.

Witnesses:
Edward Webb
George H. Fating

Inventor:
Marion Glasscock

M. GLASSCOCK.
Plow.
No. 226,609. Patented April 20, 1880.
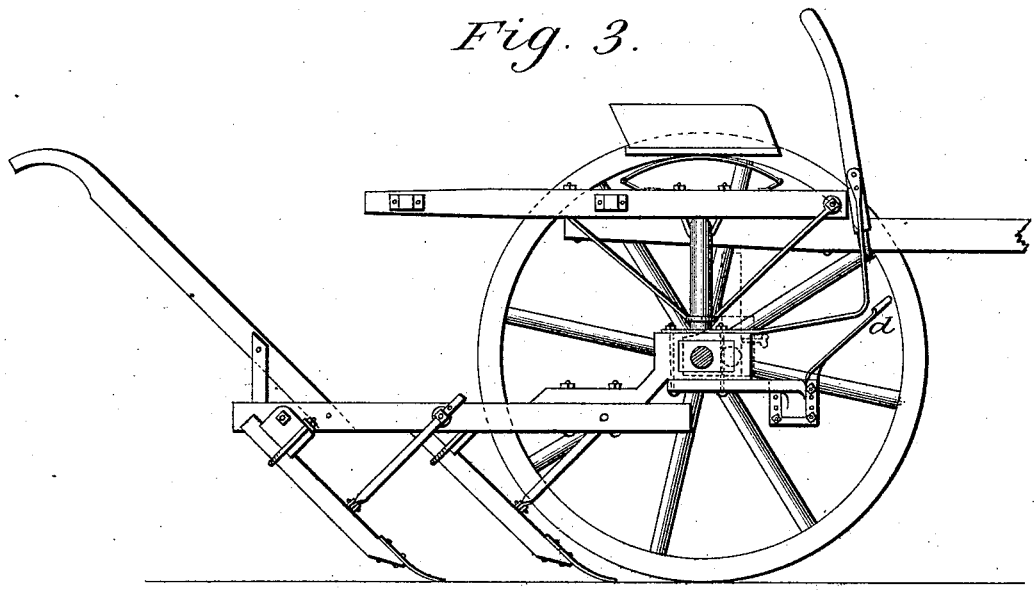
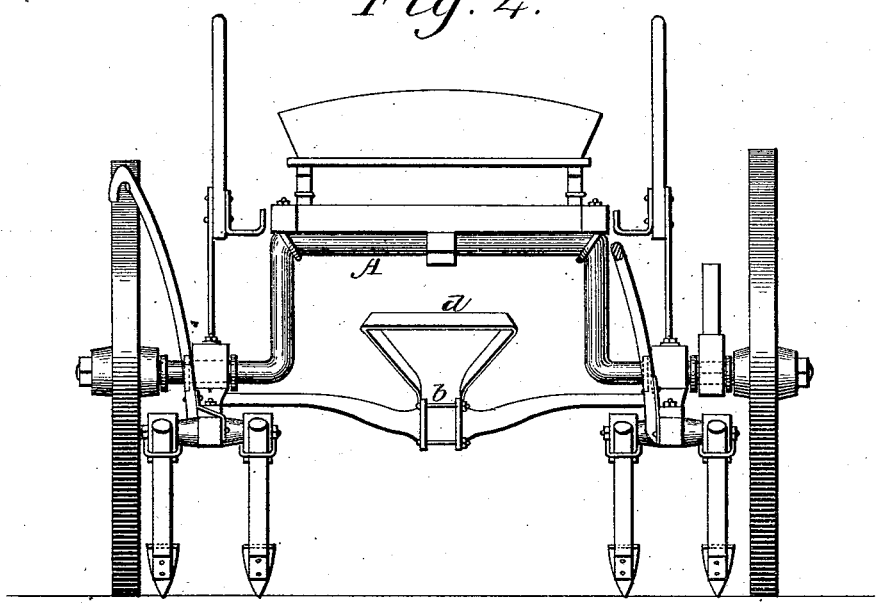
Witnesses: Edward Webb, George H. Tatum
Inventor: Marion Glasscock

UNITED STATES PATENT OFFICE.

MARION GLASSCOCK, OF MOUNT VERNON, MISSOURI.

PLOW.

SPECIFICATION forming part of Letters Patent No. 226,609, dated April 20, 1880.

Application filed February 9, 1880.

*To all whom it may concern:*

Be it known that I, MARION GLASSCOCK, of Mount Vernon, in the county of Lawrence and State of Missouri, have invented a new and useful Improvement in Plows, of which the following is a specification.

The invention relates to the running-gears of a plow that can be used either as a breaking-plow or as a cultivating-plow.

The object of my invention is to provide a system of gearing that will act as well for either plow as though it had been made for that plow alone, which will conform to any desired adjustment of the plows, to make a plow that can be used through the plowing season, to make a frame and two wheels answer for a breaking-plow, a cultivator, and harrow.

The invention consists in a couple of braces that are made to attach the breaking-plow. They are made in elbow shape. One end of each brace is bolted on the bearing on the axle that the cultivating-plows work. The plow-beam is bolted between the other ends of these braces by the means of four bolts, which make the beam and the braces solid together. These braces thus form a yoke extending forward of the axle, upon which the beam oscillates as upon a pivot. They, with their blocks, may be removed and cultivator drag-bars having coupling-blocks and levers rigidly attached be substituted.

The plow can be thrown out of the ground by placing the feet on the foot-piece $d$, which is bolted to the front end of the beam or clamp, drawing the plow backward out of the furrow.

The spindle that works in the wheel that runs in the furrow is made separate from the axle. One end is made square and at right angle with the spindle. This square end works perpendicular in a mortise which is on the end of the axle. The wheel can be made stationary at the desired depth by means of a set-screw.

With the above I claim—

1. In a wheel-plow, the curved braces C C, pivoted to the horizontal ends of the arched axle A, and having the end bearings, $c\ c$, arranged to clamp the plow-beam, substantially as shown and described.

2. The combination of the arched axle A, the bearing-blocks B B, the curved braces C C, with bearings $c\ c$, the bolts $b$, the foot-lever $d$, and the plow-beam D, the plow-beam and braces made removable to adapt for the attachment of cultivator-beams, substantially as shown and described.

MARION GLASSCOCK.

Witnesses:
GEORGE H. TATUM,
EDWARD P. WEBB.